May 22, 1951     I. C. McKECHNIE     2,553,666
METHOD OF IMPREGNATING AND COOLING ELECTRIC WINDINGS

Filed Jan. 15, 1949

INVENTOR.
IAN C. McKECHNIE

BY Edward M. Apple
ATTORNEY

Patented May 22, 1951

2,553,666

UNITED STATES PATENT OFFICE 2,553,666

METHOD OF IMPREGNATING AND COOLING ELECTRIC WINDINGS

Ian C. McKechnie, Detroit, Mich., assignor to Primeweld Corporation, Detroit, Mich., a corporation of Michigan Application January 15, 1949, Serial No. 71,126

1 Claim. (Cl. 154—80)

This invention relates to electrical devices, and particularly to electric coils.

An object of the invention is to generally improve electrical windings, and to provide a winding which is simple in construction, economical to manufacture, and efficient in operation.

Another object of the invention is to provide a method of impregnating a coil to effect rapid heat transfer from the interior to the exterior of the coil.

Another object of the invention is to provide a method of impregnating an electrical winding with an end result that the dielectric insulation about the individual turns of the winding is greatly increased and the heat dissipation factor of the winding is correspondingly improved.

The foregoing and other objects and advantages of the invention will become more apparent as the description proceeds, reference being made from time to time to the accompanying drawings, forming part of the within disclosure, in which drawings.

Figure 1:
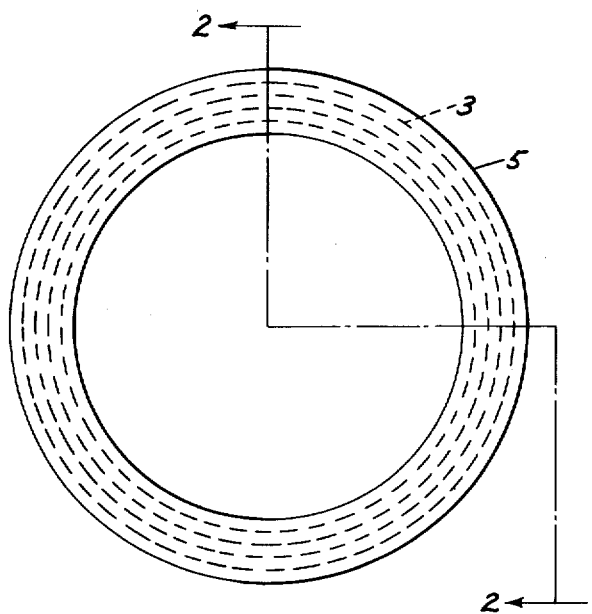
Fig. 1 is a side elevational view of an electric coil embodying the invention.
Figure 2:
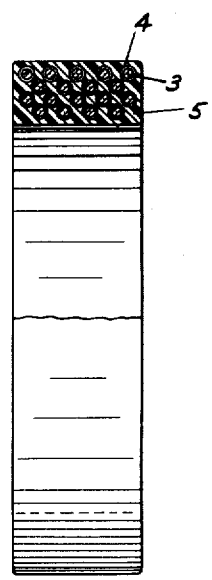
Fig. 2 is a section taken substantially on the line 2—2 of Fig. 1.

Referring now more particularly to the drawings, it will be understood that in the embodiment herein disclosed, the device embodying the invention consists of a plurality of turns of insulated electrical conductive wire wound in layer upon layer as in conventional practice. The wire 3 is covered with a suitable fabric or other type of insulation 4, and in addition thereto I prefer to impregnate the plurality of turns comprising the coil with a composition 5 as hereinafter described.

I am aware of the fact that insulating varnish has been used for many years to impregnate coils inasmuch as it has proved itself to be a good dielectric insulator and is easily applied to the windings. Insulating varnish in itself, however, has limited capacity to transfer heat from the interior to the exterior of the winding. I, therefore, propose to combine with insulating varnish in proper proportions aluminum oxide powder, which in itself is an efficient dielectric insulator, and has the ability to efficiently conduct heat. Although I herein refer specifically to insulating varnish, it will be understood that any impregnating material may be employed.

In carrying out the invention I provide approximately 1½ lbs. of aluminum oxide powder for each gallon of insulating varnish. The aluminum oxide powder is mixed with the varnish and agitated sufficiently to insure that the aluminum oxide powder is thoroughly and evenly distributed throughout the varnish. The resulting mixture will, of course, be somewhat heavier than the varnish without the aluminum oxide powder therein, but it has sufficient fluidity to permit it to be readily applied to the winding by dipping the coil therein, by applying it to the winding by various applicators, by power spraying, by drawing the wire through a bath of the varnish and aluminum oxide mixture during the coil winding operation, or by other suitable means.

Having described my invention, what I claim and desire to secure by Letters Patent is:

The method of making an electric winding with a heat transfer medium which consists of forming a coil with a plurality of turns of electric conductors and then impregnating said coil with a mixture of insulating varnish and aluminum oxide in the proportions of approximately 1½ lbs. of aluminum oxide to a gallon of varnish.

IAN C. McKECHNIE.

REFERENCES CITED

The following references are of record in the file of this patent:

UNITED STATES PATENTS

| Number | Name | Date |
| --- | --- | --- |
| 873,780 | Peterson | Dec. 17, 1907 |
| 1,840,139 | Turner | Jan. 5, 1932 |
| 1,896,042 | Ruben | Jan. 31, 1933 |
| 1,947,112 | Ruben | Feb. 13, 1934 |
| 1,981,716 | Austin | Nov. 20, 1934 |
| 2,484,214 | Ford | Oct. 11, 1949 |